March 6, 1928. 1,661,944
P. M. HEINZ
UNIVERSAL SETTING GAUGE
Filed Feb. 16, 1927
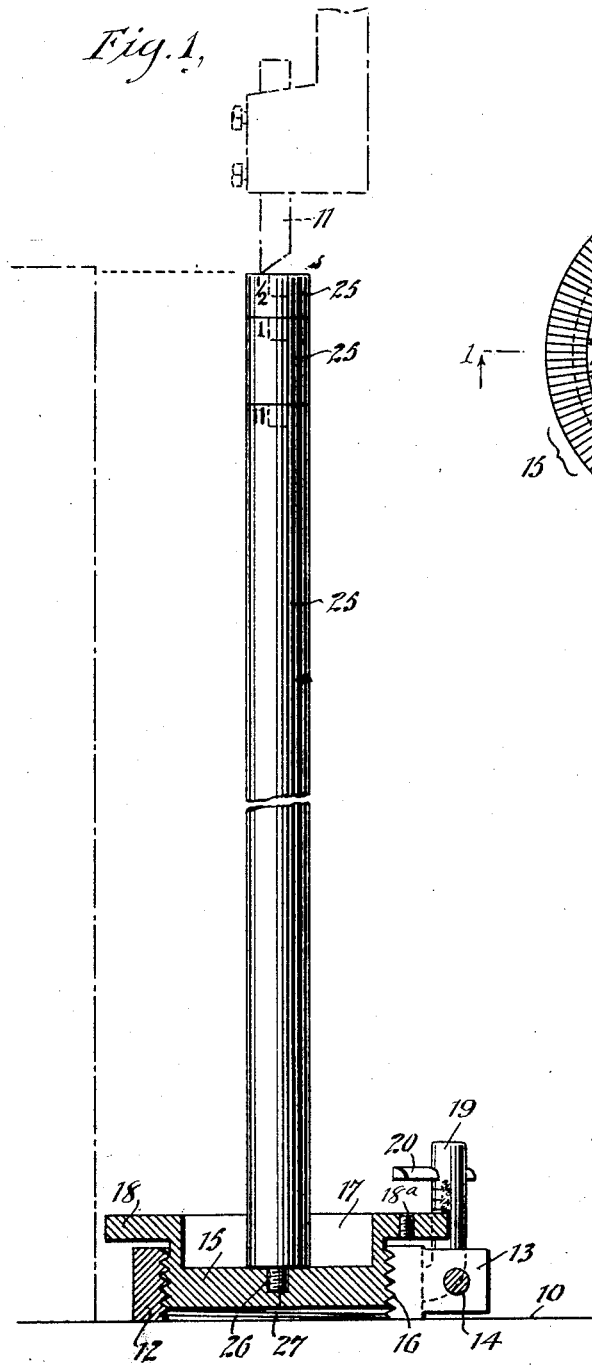
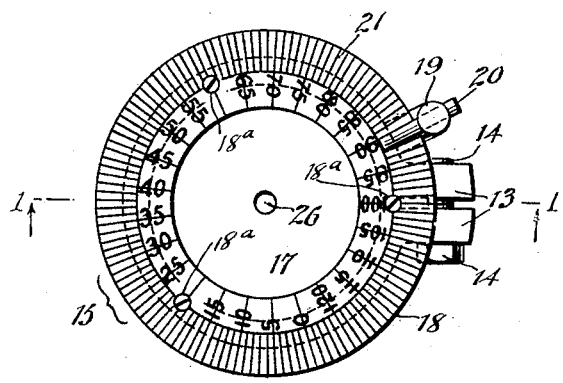
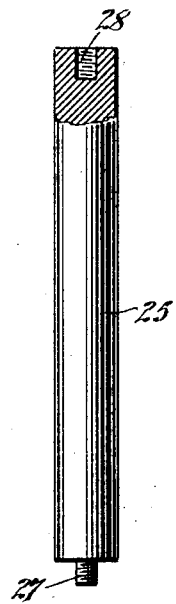
INVENTOR
P. M. Heinz
BY
ATTORNEY
WITNESSES Patented Mar. 6, 1928.

1,661,944

UNITED STATES PATENT OFFICE.

PETER M. HEINZ, OF DUBUQUE, IOWA.

UNIVERSAL SETTING GAUGE.

Application filed February 16, 1927. Serial No. 168,734.

The gauge of the present invention is capable of a wide range of utility, finding its preferred field of use as a gauge for planer tools, shaper tools, milling cutters, etc., which must be set at a predetermined distance above a bed plate or table. As a matter of fact, the device is in the nature of a height gauge capable of micrometric settings.

An object of the invention is to provide a gauge of this character capable of ready manual adjustment, or operation with facility and expedition, and a gauge which may be readily set upon any machine such for instance as the table of a planer and instantaneously adjusted to gauge the height of a planer tool.

Other objects of the invention are to provide a gauge of simple, practical construction which will be rugged, durable and accurate in use, and which may be manufactured with comparative economy.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a view partly in side elevation and partly in vertical section through the gauge of the present invention showing the same in use.

Fig. 2 is a top plan view of the upper base block with the measuring rods removed.

Fig. 3 is a view partly in section and partly in side elevation of one of the measuring rods.

In the drawings I have used the reference character 10 to designate the table of a planer and 11, one of the planing tools, and showing the gauge of the present invention in proper position to gauge the height of the tool.

The gauge consists of a lower split annular base block 12 formed with laterally projecting ears 13 through which is passed a screw 14 for contracting the lower base block to firmly clamp an upper base block 15 normally rotatable therein.

The lower base block is internally threaded as at 16, these threads preferably being arranged at such a pitch that the upper base block which screws into them, must be rotated four complete revolutions to complete an axial movement of one-half inch relatively to the lower base block.

Upper base block 15 is formed with a circular recess 17 sunk in its face, leaving the total width of block 15 from the surface of the recess to the bottom of the block 12, one-half inch. When the block 15 has been screwed home in the block 12, an outwardly projecting flange 18 on the block 15 comes to rest on the upper surface of the block 12 and acts as a stop. Hardened headless set screws 18ª in the flange 18 take up the wear between the blocks 12 and 15. A graduated index post 19 rigidly connected to and laterally offset from the block 12, carries an inwardly projecting stop arm 20 projecting over the flange 18. The distance between the upper surface of the flange 18 and the lower surface of the arm 20 is graduated on the index post in eighths of an inch, so that the total axial movement of the upper base block 15 will be through a distance of one-half inch, and the upper base block must be rotated through four revolutions to travel this distance.

The stop arm 20 and index post 19 serve as a pointer coacting with a scale 21 displayed on the upper face of the flange 18. This scale is preferably sub-divided into 125 divisions, each of these divisions corresponding to one thousandth of an inch, as will be readily understood, since each revolution of the block 15 causes it to travel one-eighth of an inch, or .125 inch.

The micrometric adjustment is obtained by rotating the base block 15 and observing the readings on the dial 21. The one-eighth inch measurements are readily observable from the scale on the index post 19. A series of measuring rods 25 of various lengths and preferably having their lengths marked on them, may be screwed together and into a threaded pocket 26 in the bottom of the recess 17. Preferably these rods run from 12 inch lengths to one-half inch lengths, finer final adjustments being obtained by rotating the block 15. Each of the rods includes a threaded extension 27 at one end adapted to be screwed into a corresponding socket 28 in the other end of an adjacent rod, the extension 27 of the lowermost rod entering the socket 26 as above noted. When gauging the height of a tool such for instance as the planer tool 11, the base block unit 12, 15 is placed on the table 10 of the machine, with the flanges of the upper block 18 screwed down on to the top of the lower block 12, and in consequence with the pointer 20 of the index post set at zero, and the index post scale at zero. A series of measuring rods 25 are then coupled together, these rods cooperatively measuring a distance less than one-half inch shorter than the total height to which the tool is to be set. The remaining final adjustment is obtained by rotating the block 15; this final adjustment being graduated to thousandths on the particular scale illustrated and permitting fine work to be done even though the adjustment is effected through the intermediacy of the relatively coarsely cut screw 16.

It will be evident that the particular number of measuring rods 25 which make up a set to go with the tool, and the particular lengths of these rods, form no part of the present invention, and may be infinitely varied. I have found however, that the use of one rod 11 inches high, one—4 inches, one—3 inches, one—2 inches, two—1 inch, and two—½ inch, are particularly convenient for obtaining any measurement up to 2 feet, and that additional rods of 1 foot length may be used if desired.

After the gauge has been set, screws 14 may be tightened to clamp the gauge in any desired adjusted position, and the tool 11 moved donwardly until it contacts with the upper surface of the composite measuring rod 25, 25.

Obviously, various changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claims.

I claim:

1. A gauge of the class described including a base block, an adjustable block screw threadedly connected to the base block and capable of limited axial movement relatively thereto, said adjustable block displaying scale marks on its upper face and a stationary finger carried by the base block cooperating with said scale marks, said finger limiting axial movement of the adjustable block in an upward direction.

2. A gauge of the class described including a base block, an adjustable block screw threadedly connected to the base block and capable of limited axial movement relatively thereto, said adjustable block displaying scale marks on its upper face and a stationary finger carried by the base block cooperating with said scale marks, said adjustable block including an outwardly extending annular flange engageable with the base block to limit axial movement of the adjustable block in a downward direction.

3. A gauge of the class described including a base block, an adjustable block screw threadedly connected to the base block and capable of limited axial movement relatively thereto, said adjustable block displaying scale marks on its upper face, an index post rising from the base block, a stationary finger carried by the post cooperating with said scale marks, said index post being graduated to indicate the distance travelled by the adjustable block at each revolution thereof.

4. A gauge of the class described including a base block, an adjustable block screw threadedly connected to the base block and capable of limited axial movement relatively thereto, said adjustable block displaying scale marks on its upper face and a stationary indicator carried by the base block cooperating with said scale marks, said base block comprising an annular split internally threaded member, and means for circumferentially contracting the same to lock the adjustable block against movement.

5. A gauge of the class described including a base block, an adjustable block screw threadedly connected to the base block and capable of limited axial movement relatively thereto, said adjustable block displaying scale marks on its upper face and a stationary indicator carried by the base block cooperating with said scale marks, said adjustable block having a recess in its upper face socketed for the reception of the end of a gauge rod.

6. A gauge of the class described including a base block, an adjustable block screw threadedly connected to the base block and capable of limited axial movement relatively thereto, said adjustable block displaying scale marks on its upper face and a stationary indicator carried by the base block cooperating with said scale marks, and a series of measuring gauge rods, all of which are adapted to be mounted on the adjustable block.

PETER M. HEINZ.